United States Patent [19]
Miyata

[11] Patent Number: 5,343,449
[45] Date of Patent: Aug. 30, 1994

[54] OVER-WRITE CAPABLE MAGNETOOPTICAL RECORDING MEDIUM HAVING READING LAYER

[75] Inventor: Kazutomo Miyata, Kawasaki, Japan
[73] Assignee: Nikon Corporation, Tokyo, Japan
[21] Appl. No.: 128,766
[22] Filed: Sep. 17, 1993
[30] Foreign Application Priority Data
 Sep. 18, 1992 [JP] Japan ................... 4-249134
[51] Int. Cl.$^5$ ............................................. G11B 11/00
[52] U.S. Cl. ...................... 369/13; 369/284; 369/275.2; 360/59
[58] Field of Search ............. 369/13, 275.1, 275.2, 369/275.3, 275.4, 275.5, 284, 286, 287, 288, 121, 110, 59; 360/114, 59; 365/122, 10; 428/694, 900

[56] References Cited

U.S. PATENT DOCUMENTS

| | | | |
|---|---|---|---|
| 5,132,945 | 7/1992 | Osato et al. | 369/13 |
| 5,191,564 | 3/1993 | Hosokawa | 369/13 |
| 5,239,524 | 8/1993 | Sato et al. | 369/13 |

FOREIGN PATENT DOCUMENTS

| | | |
|---|---|---|
| 0258978 | 3/1988 | European Pat. Off. . |
| 0498435 | 8/1992 | European Pat. Off. . |
| 0498440 | 8/1992 | European Pat. Off. . |
| 0498455 | 8/1992 | European Pat. Off. . |
| 0508376 | 10/1992 | European Pat. Off. . |
| 62-175948 | 8/1987 | Japan . |
| 63-237238 | 10/1988 | Japan . |
| 63-239637 | 10/1988 | Japan . |
| 64-50257 | 2/1989 | Japan . |
| 1-273248 | 11/1989 | Japan . |
| WO90/02400 | 3/1990 | World Int. Prop. O. . |

OTHER PUBLICATIONS

Swartz, R. et al, "Stabilized Biasing of Semiconductor Lasers", *The Bell System Journal*, vol. 62, No. 7, Part 1 (1983), pp. 1923–1936.
Japanese Journal "Optronics", (1990), No. 4, pp. 227–231.

Primary Examiner—Robert J. Pascal
Assistant Examiner—Ali Neyzari
Attorney, Agent, or Firm—Shapiro and Shapiro

[57] ABSTRACT

A medium comprises a reading layer, a memory layer and a writing layer. The reading layer, the memory layer and the writing layer are exchange-coupled to each other to form a three-layered structure. The medium satisfies the following condition at room temperature and during reproduction:

i) $2M_{SR}H_{CR}t_R < \sigma_{W1}$;
ii) $2M_{SR}H_{CR}t_R + 2M_{S1}H_{C1}t_1 > \sigma_{W12}$;
iii) $Hb < (\sigma_{WR1}/2M_{SR}t_R) + H_{CR}$, where $t_R$ is a film thickness of the reading layer, $t_1$ is a film thickness of the memory layer, $M_{SR}$ is saturation magnetization of the reading layer, $M_{S1}$ is saturation magnetization of the memory layer, $H_{CR}$ is a coercivity of the reading layer, $H_{C1}$ is a coercivity of the memory layer, $\sigma_{WR1}$ is an exchange coupling force between the reading layer and the memory layer, $\sigma_{W12}$ is an exchange coupling force between the memory layer and the writing layer, and Hb is a recording magnetic field.

1 Claim, 11 Drawing Sheets

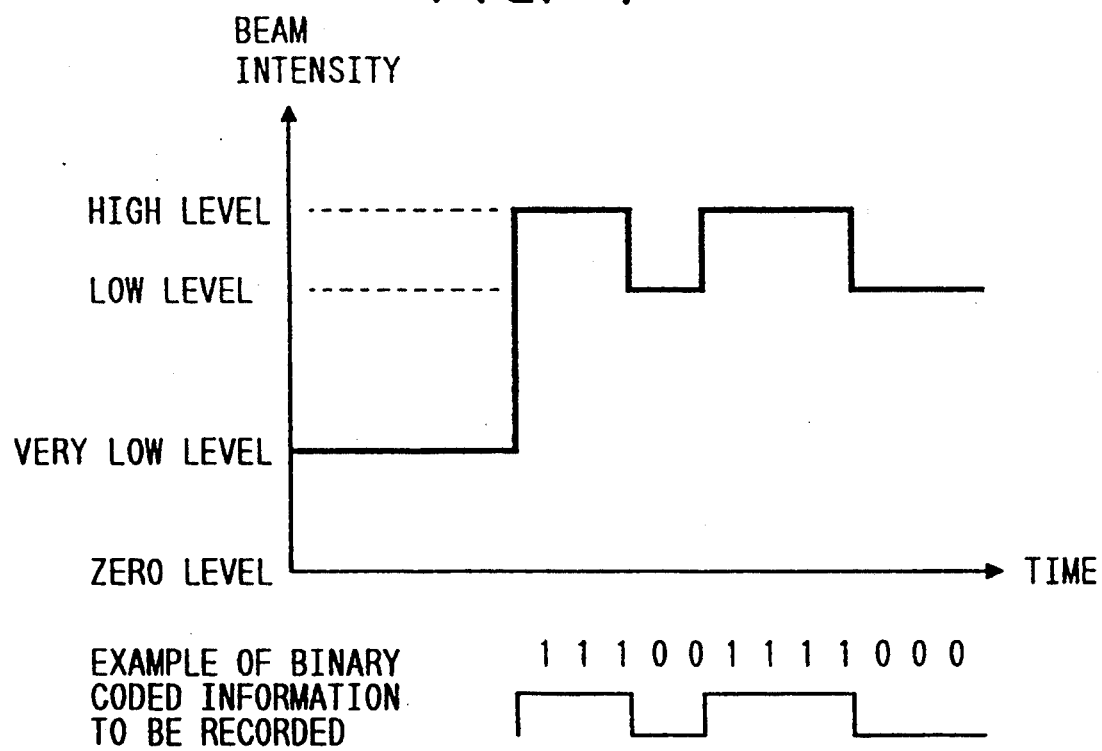
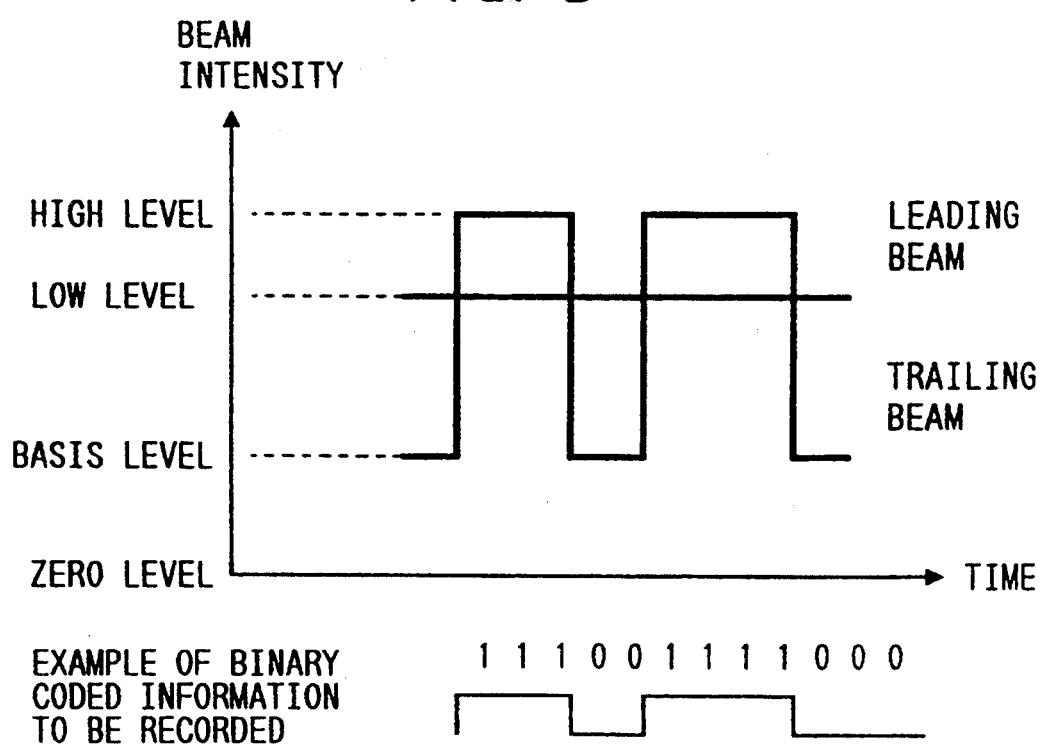

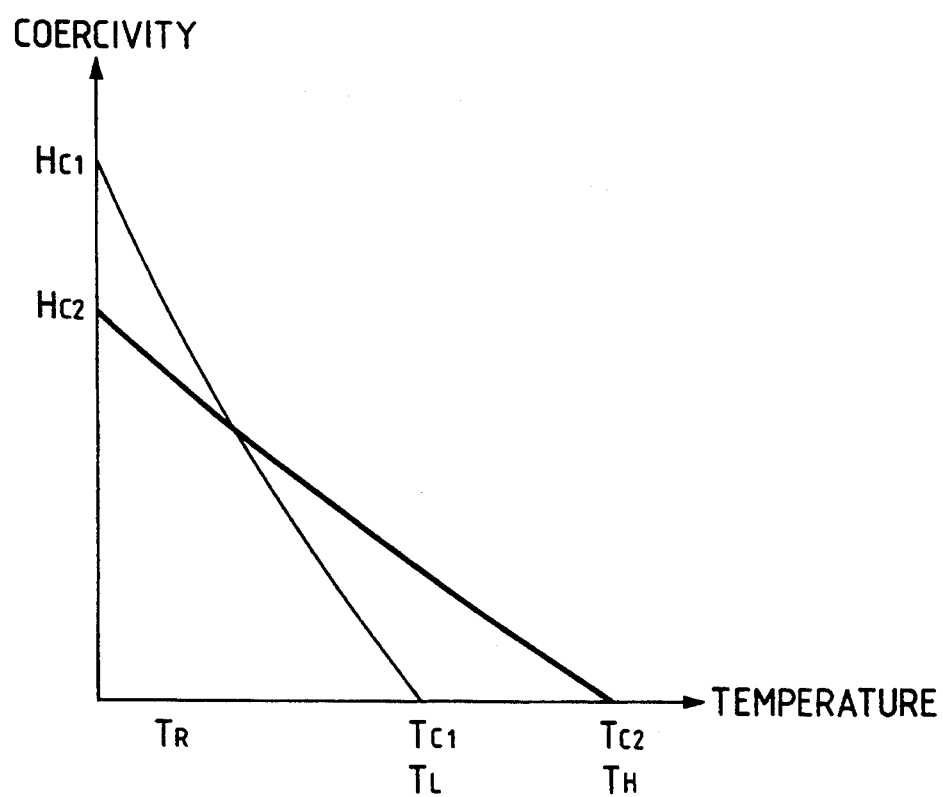

OVER-WRITE CAPABLE MAGNETOOPTICAL RECORDING MEDIUM HAVING READING LAYER

BACKGROUND OF THE INVENTION

1. Field of the Invention

The present invention relates to a magnetooptical recording medium, which can perform an over-write operation upon being irradiated with a laser beam, which is pulse-modulated according to binary information to be recorded, without modulating the direction and intensity of a bias field Hb.

An over-write operation means an operation for recording new information without erasing previous information. In this case, when recorded information is reproduced, the previous information must not be reproduced.

2. Related Background Art

In recent years, many efforts have been made to develop an optical recording/reproduction method which can satisfy various requirements including high density, large capacity, high access speed, and high recording-/reproduction speed, and a recording apparatus, a reproduction apparatus, and a recording medium used therefor.

Of various optical recording/reproduction methods, the magnetooptical recording/reproduction method is most attractive due to its unique advantages in that information can be erased after it is recorded, and new information can be repetitively recorded.

A recording medium used in the magnetooptical recording/reproduction method has a perpendicular magnetic layer or layers as a recording layer. The magnetic layer comprises, for example, amorphous GdFe or GdCo, GdFeCo, TbFe, TbCo, TbFeCo, and the like. Concentrical or spiral tracks are normally formed on the recording layer, and information is recorded on the tracks.

There are two types of tracks, i.e., explicit tracks and implicit tracks.

EXPLICIT TRACK

A magnetooptical recording medium has a disk shape. When a disk having explicit tracks is viewed from a direction perpendicular to the disk plane, spiral concentric tracks for recording information are formed. A groove for tracking and separation is present between two adjacent tracks. Contrary to this, a portion between adjacent grooves is called a land. In practice, the lands and grooves are reversed on the upper and lower surfaces of the disk. Thus, when the disk is viewed from the same direction as the beam incidence direction, a near portion is called a groove, and a far portion is called a land. A perpendicular magnetic film is formed on both the grooves and lands. For this reason, a groove portion may be used as a track, and a land portion may be used as a track. The widths of the groove and land have no special relationship therebetween.

Generally, lands formed on a surface in a spiral or concentrical pattern, and grooves each sandwiched between two adjacent grooves are present on a substrate. A perpendicular magnetic film is formed on such a substrate.

MARK

In this specification, one of "upward" and "downward" directions of magnetization with respect to a film surface is defined as an "A direction", and the other one is defined as a "non-A direction". Information to be recorded is binary-coded in advance, and is recorded by two singnals, i.e., a mark ($B_1$) having an "A-directed" magnetization, and a mark ($B_0$) having a "non-A-directed" magnetization. These mark $B_1$ and $B_0$ correspond to "1" "0" levels of a digital signal. However, in general, the direction of magnetization of the recording tracks can be aligned in the "non-A direction" by applying a strong external field before recording. This "aligning process" is called "initialize*" in a conventional sense. Thereafter, a mark ($B_1$) having an "A-directed" magnetization is formed on the tracks. Information is expressed in accordance with the presence/absence and/or a mark length of the mark ($B_1$). Note that a mark is often called a pit or bit previously but called a mark recently.

Principle of Mark Formation

In the mark formation, a characteristic feature of laser, i.e., excellent coherence in space and time, is effectively used to focus a beam into a spot as small as the diffraction limit determined by the wavelength of the laser light. The focused light is radiated onto the track surface to record information by producing marks less than 1 μm in diameter on the recording layer. In the optical recording, a recording density up to $10^8$ marks/cm$^2$ can be theoretically attained, since a laser beam can be concentrated into a spot with a size as small as its wavelength.

As shown in FIG. 2, in the magnetooptical recording, a laser beam (L) is focused onto a recording layer (1) to heat it, while a bias field (Hb) externally operates on the heated portion in the direction opposite to the initialized* direction. A coercivity $H_C$ of the locally heated portion is decreased below the bias field (Hb). As a result, the direction of magnetization of that portion is aligned in the direction of the bias field (Hb). In this way, reversely magnetized marks are formed.

Ferromagnetic and ferrimagnetic materials differ in the temperature dependencies of the magnetization and $H_C$. Ferromagnetic materials have $H_C$ which decreases around the Curie temperature and allow information recording based on this phenomenon. Thus, information recording in ferromagnetic materials is referred to as $T_C$ recording (Curie temperature recording).

On the other hand, ferrimagnetic materials have a compensation temperature $T_{comp.}$, below the Curie temperature, at which magnetization (M) becomes zero. The $H_C$ abruptly increases around this temperature and hence abruptly decreases outside this temperature. The decreased $H_C$ is canceled by a relatively weak bias field (Hb). Namely, recording is enabled. This process is called $T_{Comp.}$ recording (compensation point recording).

In this case, however, there is no need to adhere to the Curie point or the compensation temperature precisely. In other words, if a bias field (Hb) Capable of canceling a decreased $H_C$ operates on a magnetic material having the decreased $H_C$ at a predetermined temperature higher than a room temperature, recording is enabled.

Principle of Reproduction

FIG. 3 shows the principle of information reproduction based on the magnetooptical effect. Light is an electromagnetic wave with an electromagnetic-field vector normally emanating in all directions in a plane perpendicular to the light path. When light is converted to linearly polarized beams ($L_P$) and irradiated onto a recording layer (1), it is reflected by its surface or passes through the recording layer (1). At this time, the plane of polarization rotates according to the direction of magnetization. This phenomenon is called the magnetic Kerr effect or magnetic Faraday effect.

For example, if the plane of polarization of the reflected light rotates $\theta_k$ degrees for the "A-directed" magnetization, it rotates $-\theta_k$ degrees for the "non-A-directed" magnetization. Therefore, when the axis of an optical analyzer (polarizer) is set perpendicular to the plane inclined at $-\theta_k$, the light reflected by a "non-A-direction" magnetized mark ($B_0$) cannot pass through the analyzer. On the contrary, a component corresponding to a product of $(\sin 2\theta_k)^2$ and the light reflected by a mark ($B_1$) magnetized along the "A direction" passes through the analyzer and becomes incident on a detector (photoelectric conversion means). As a result, the mark ($B_1$) magnetized along the "A direction" looks brighter than the mark ($B_0$) magnetized along the "non-A-direction" and causes the detector to produce a stronger electrical signal. The electrical signal from the detector is modulated in accordance with the recorded information, thus reproducing the information.

In order to re-use a recorded medium, (i) the medium must be re-initialized* by an initialize* device or (ii) an erase head having the same arrangement as a recording head must be added to a recording apparatus, or (iii) as preliminary processing, recorded information must be erased using a recording apparatus or an erasing apparatus.

Therefore, in the conventional magnetooptical recording method, it is impractical to perform an over-write operation, which can properly record new information regardless of the presence/absence of recorded information.

If the direction of a bias field Hb can be desirably modulated between the "A-direction" and "non-A-direction", an over-write operation is possible. However, it is impossible to modulate the direction of the bias field Hb at high speed. For example, if the bias field Hb comprises a permanent magnet, the direction of the magnet must be mechanically reversed. However, it is impossible to reverse the direction of the magnet at high speed. Even when the bias field Hb comprises an electromagnet, it is also impossible to modulate the direction of a large-capacity current at high speed.

However, according to remarkable technical developments, a magnetooptical recording method capable of performing an over-write operation by modulating only an intensity of a light beam to be irradiated in accordance with binary coded information to be recorded without modulating a magnitude (including an ON/OFF state) or the direction of the bias field Hb, an over-write capable magnetooptical recording medium used in this method, and an over-write capable recording apparatus used in this method were disclosed in Japanese Patent Laid-Open Application No. 62-175948 corresponding to DE 3,619,618 and to U.S. application Ser. No. 253,255. This invention will be quoted as the basic invention hereinafter.

DESCRIPTION OF THE BASIC INVENTION

The basic invention uses an "over-write capable multilayered magnetooptical recording medium which includes a recording layer (to be referred to as a memory layer or M layer hereinafter in this specification) which comprises a perpendicularly magnetizable magnetic thin film, and a reference layer (to be referred to as a "writing layer" or W layer hereinafter in this specification) which comprises a perpendicularly magnetizable magnetic thin film, and in which the two layers are exchange-coupled, and the direction of magnetization of only the W layer can be aligned in a predetermined direction without changing the direction of magnetization of the M layer at a room temperature".

Information is expressed by a mark having an "A-directed" magnetization, and a mark having a "non-A-directed" magnetization in the M layer (in some cases, also in the W layer).

In this medium, the direction of magnetization of the W layer can be aligned in an "A direction" by an external means (e.g., an initial field Hini.). At this time, the direction of magnetization of the M layer is not reversed. Furthermore, the direction of magnetization of the W layer which has been aligned in the "A direction" is not reversed upon application of an exchange coupling force from the M layer. In contrast to this, the direction of magnetization of the M layer is not reversed upon application of an exchange coupling force from the W layer aligned in the "A direction".

The W layer has a lower coercivity $H_C$ and a higher Curie temperature $T_C$ than those of the M layer.

According to a recording method of the basic invention, only the direction of magnetization of the W layer of the recording medium is aligned in the "A direction" by an external means until a time immediately before recording. This process will be specially referred to as "initialize" in this specification. The "initialize" process is unique to an over-write capable medium.

Thereafter, a laser beam which is pulse-modulated in accordance with binary coded information is irradiated on the medium. The laser beam intensity has high level $P_H$ and low level $P_L$. These high and low levels correspond to high and low levels of a pulse. Note that low level is higher than very low level* $P_R$ to be irradiated on the medium in a reproduction mode. As is known, even in a non-recording state, or example a laser beam may be emitted at a <very low level> to access a predetermined recording position on the medium. This <very low level> is equal or close to reproduction level $P_R$. Therefore, for example, an output waveform of a laser beam in the basic invention is as shown in FIG. 4.

Although not described in the specification of the basic invention, a recording beam need not always be a single beam but may be two proximity beams in the basic invention. More specifically, a leading beam may be used as a low-level laser beam (erasing beam) which is not modulated in principle, and a trailing beam may be used as a high-level laser beam (writing beam) which is modulated in accordance with information. In this case, the trailing beam is pulse-modulated between high level and base level (equal to or lower than low level, and its output may be zero). In this case, an output waveform is as shown in FIG. 5.

A bias field Hb whose direction and strength are not modulated operates on a medium portion irradiated with the beam. The bias field Hb cannot be focused to a size as small as the portion irradiated with the beam (spot region), and a region where the bias field Hb is operates on considerably larger than the spot region.

When a low-level beam is radiated, a mark in one of the "A direction" and the "non-A direction" is formed in the M layer regardless of the direction of magnetization of a previous mark.

When a high-level beam is irradiated, a mark in the other direction is formed in the M layer regardless of the direction of magnetization of the previous mark.

Thus, the over-write operation is completed.

In the basic invention, a laser beam is pulse-modulated according to information to be recorded. However, this procedure itself has been performed in the conventional magnetooptical recording method, and a means for pulse-modulating the beam intensity on the basis of binary coded information to be recorded has been known For example, see "THE BELL SYSTEM TECHNICAL JOURNAL, Vol. 62 (1983), pp. 1923-1936 for further details. Therefore, the modulating means is available by partially modifying the conventional beam modulating means if required high and low levels of the beam intensity are given. Such a modification would be easy for those who are skilled in the art if high and low levels of the beam intensity are given.

One characteristic feature of the basic invention lies in high and low levels of the beam intensity. More specifically, when the beam intensity is at high level, "A-directed" magnetization of the W layer is reversed to the "non-A direction" by an external means such as a bias field (Hb) and the like, and a mark having the "non-A-directed" [or "A-directed"] magnetization is thus formed in the M layer by the "non-A-directed" magnetization of the W layer. When the beam intensity is at low level, the direction of magnetization of the W layer is left unchanged from the initialized state, and a mark having the "A-directed" [or "non-A-directed"]magnetization is formed in the M layer under the influence of the W layer (this influence is exerted on the M layer by the exchange coupling force).

In this specification, if expressions ooo [or ΔΔΔ] appear ooo outside the brackets in the first expression corresponds to ooo in the subsequent expression ooo [or ΔΔΔ], and vice versa.

A medium used in the basic invention is roughly classified into first and second categories. In either category, a recording medium has a multilayered structure including the M and W layers.

The M layer is a magnetic layer, which exhibits a high coercivity at a room temperature, and has a low magnetization reversing temperature. The W layer is a magnetic layer, which exhibits a relatively lower coercivity at a room temperature and has a higher magnetization reversing temperature than those of the M layer. Note that each of the M and W layers may comprise a multilayered structure. If necessary, an intermediate layer (e.g., an adjusting layer for an exchange coupling force $\sigma_W$) may be interposed between the M and W layers. Relating to the intermediate layer (to be referred to as an I layer hereinafter in this specification), see Japanese Patent Laid-Open Application No. 63-239637 (CANON), No. 64-50257 (NIKON) and No. 1-273248 (NIKON).

In the first category, when the coercivity of the M layer is represented by $H_{C1}$; that of the W layer, $H_{C2}$; a Curie temperature of the M layer, $T_{C1}$; that of the W layer, $T_{C2}$; a room temperature, $T_R$; a temperature of the recording medium obtained when a laser beam at low level $P_L$ is irradiated, $T_L$; that obtained when a laser beam at high level $P_H$ is irradiated, $T_H$; a coupling field operates on the M layer, $H_{D1}$; and a coupling field applied to the W layer, $H_{D2}$, the recording medium satisfies Formula 1 below, and satisfies Formulas 2 to 5 at the room temperature:

$$T_R < T_{C1} \approx T_L < T_{C2} \approx T_H \quad \text{Formula 1}$$

$$H_{C1} > H_{C2} + |H_{D1} \mp H_{D2}| \quad \text{Formula 2}$$

$$H_{C1} > H_{D1} \quad \text{Formula 3}$$

$$H_{C2} > H_{D2} \quad \text{Formula 4}$$

$$H_{C2} + H_{D2} < |H_{ini.}| < H_{C1} \pm H_{D1} \quad \text{Formula 5}$$

In the above formulas, symbol "$\approx$" means "equal to" or "substantially equal to ($\pm 20°$ C.)". In addition, of double signs $\pm$ and $\mp$, the upper sign corresponds to an A (antiparallel) type medium, and the lower sign corresponds to a P (parallel) type medium (these media will be described later). Note that a ferromagnetic medium belongs to a P type.

The relationship between a coercivity and a temperature is as shown in the graph of FIG. 6. In FIG. 6, a thin curve represents the characteristics of the M layer, and a bold curve represents those of the W layer.

Therefore, when an external means, e.g., an initial field (Hini.) operates on this recording medium at the room temperature, the direction of magnetization of only the W layer is reversed without reversing that of the M layer according to Formula 5. When the external means exerts an influence (e.g., the initial field (Hini.)) on the medium before recording, only the direction of magnetization of the W layer can be aligned in the "A direction". That is, the "initialize" process is performed. In the following description, the "A direction" is indicated by an upward arrow ↑ in this specification, and the "non-A direction" is indicated by a downward arrow ↓ for the sake of simplicity. If the initial field Hini. becomes zero, the direction of magnetization ↑ of the W layer can be left unchanged without being re-reversed according to Formula 4.

FIG. 7 schematically shows a state wherein only the W layer is magnetized by the external means in the "A direction" ↑ until a time immediately before recording.

In FIG. 7, the direction of magnetization* in the M layer represents previously recorded information. In the following description, since the direction of magnetization of the M layer can be disregarded, it is simply indicated by X, as shown in CONDITION 1 in FIG. 8.

In CONDITION 1, a high-level laser beam is radiated on the medium to increase a medium temperature to $T_H$. Since $T_H$ is higher than the Curie temperature $T_{C1}$ the magnetization of the M layer disappears. In addition, since $T_H$ is near the Curie temperature $T_{C2}$, the magnetization of the W layer also disappears completely or almost completely. The bias field Hb in the "A direction" or "non-A direction" operates on the medium in accordance with a type of medium. The bias field Hb may be a stray field from the medium itself. For the sake of simplicity, assume that the bias field Hb in the "non-A direction" operates on the medium. Since the medium moving, a given irradiated portion is immediately separated apart from the laser beam, and cools. When the medium temperature is decreased under the presence of Hb, the direction of magnetization of the W layer is reversed to the "non-A direction" ↓ to follow (CONDITION 2 in FIG. 8).

When the medium is further cooled and the medium temperature is decreased slightly below $T_{C1}$, magnetization of the M layer appears again. In this case, the direction of magnetization of the M layer is influenced by that of the W layer through a magnetic coupling (exchange coupling) force, and is aligned in a predetermined direction. As a result, a "non-A-directed" ⇓ mark (the P type medium) or an "A-directed" ⇑ mark (the A type medium) is formed according to the type of medium. This state corresponds to CONDITION 3 (P type) or 4 (A type) in FIG. 8.

A change in condition caused by the high-level laser beam will be called a high-temperature cycle herein.

A laser beam at low level $P_L$ is irradiated on the medium to increase the medium temperature to $T_L$. Since $T_L$ is near the Curie temperature $T_{C1}$, the magnetization of the M layer disappears completely or almost completely. However, since $T_L$ is lower than the Curie temperature $T_{C2}$, the magnetization of the W layer does not disappear. This state is represented by CONDITION 5 in FIG. 8. In this state, although the bias field Hb is unnecessary, it cannot be turned on and off at high speed (within a short period of time). Therefore, the bias field Hb in the high-temperature cycle is left inevitably.

However, since the $H_{C2}$ is kept high, the magnetization ⇑ of the W layer will not be reversed by Hb. Since the medium is moving, a given irradiated portion is immediately separated apart from the laser beam, and cools as cooling progresses, the magnetization of the M layer appears again. The direction of magnetization appearing in this case is influenced by the W layer through the magnetic coupling force, and is aligned in a predetermined direction. As a result, an "A-directed" ⇑ mark (P type) or a "non-A-directed" ⇓ mark (A type) is formed in the M layer according to the type of medium. This magnetization is left unchanged at the room temperature. This state corresponds to CONDITION 6 (P type) or 7 (A type) in FIG. 8.

A change in condition caused by the low-level laser beam will be called a low-temperature cycle herein.

As described above, "on-A-directed" and "A-directed" marks can be desirably formed by selecting the high- and low-temperature cycles independently of the direction of magnetization of the M layer before recording. More specifically, an over-write operation is enabled by pulse-modulating the laser beam between high level (high-temperature cycle) and low level (low-temperature cycle) in accordance with information. Refer to FIGS. 9 and 10. FIGS. 9 and 10 illustrate directions of magnetization of P and A type media at the room temperature or formed when the medium temperature is returned to the room temperature.

In the above description, both the M and W layers have no compensation temperature $T_{comp.}$ between the room temperature and the Curie temperature. However, when the compensation temperature $T_{comp.}$ is present, if the medium temperature exceeds it, (i) the direction of magnetization is reversed (in practice, although the directions of sublattice magnetization of RE and TM atoms are not changed, since the relationship between their strengths is reversed, the direction of magnetization of the alloy is reversed), and (ii) A and P types are reversed. For these reasons, a description must be complicated accordingly. In this case, the direction of the bias field Hb is opposite to the direction ↓ in the above description at the room temperature. That is, Hb in the same direction as the "initialized" direction ↑ of magnetization of the W layer is applied.

A recording medium normally has a disk shape, and is rotated during recording. For this reason, a recorded portion (mark) is influenced again by an external means, e.g., Hini. after recording. As a result, the direction of magnetization of the W layer is aligned in the original "A direction" ⇑. In other words, the W layer is "initialized". However, at the room temperature, the magnetization of the W layer can no longer influence that of the M layer, and the recorded information can be held.

If linearly polarized light is irradiated on the M layer, since light reflected thereby includes information, the information can be reproduced as in the conventional magnetooptical recording medium.

A perpendicular magnetic film constituting each of the M and W layers is selected from the group consisting of (i) amorphous or crystalline ferromagnetic and ferrimagnetic materials having no compensation temperature and having a Curie temperature, and (ii) an amorphous or crystalline ferrimagnetic material having both the compensation temperature and the Curie temperature.

The first category which utilizes the Curie temperature as the magnetization reversing temperature has been described. In contrast to this, the second category utilizes $H_c$ decreased at a temperature lower than the Curie temperature. In the second category, substantially the same description as the first category can be applied except that a temperature $T_{S1}$, at which the M layer is magnetically coupled to the W layer is used in place of $T_{C1}$ in the first category, and a temperature $T_{S2}$ at which the direction of magnetization of the W layer is reversed by Hb is used in place of $T_{C2}$.

In the second category, when the coercivity of the M layer is represented by $H_{C1}$; that of the W layer, $H_{C2}$; a temperature at which the M layer is magnetically coupled to the W layer, $T_{S1}$; a temperature at which the magnetization of the W layer is reversed by Hb, $T_{S2}$; a room temperature, $T_R$; a medium temperature obtained when a laser beam at low level $P_L$ is irradiated, $T_L$; that obtained when a laser beam at high level $P_H$ is irradiated, $T_H$; a coupling field operates on the M layer, $H_{D1}$; and a coupling field applied to the W layer, $H_{D2}$, the recording medium satisfies Formula 6 below, and satisfies Formulas 7 to 10 at the room temperature:

$$T_R < T_{S1} \approx T_L < T_H \qquad \text{Formula 6}$$

$$H_{C1} > H_{C2} + |H_{D1} \mp H_{D2}| \qquad \text{Formula 7}$$

$$H_{C1} > H_{D1} \qquad \text{Formula 8}$$

$$H_{C2} > H_{D2} \qquad \text{Formula 9}$$

$$H_{C2} + H_{D2} < |\text{Hini.}| < H_{C1} \pm H_{D1} \qquad \text{Formula 10}$$

In the above formulas, of double signs ± and ∓, the upper sign corresponds to an A (antiparallel) type medium, and the lower sign corresponds to a P (parallel) type medium (these media will be described later).

In the second category, when the medium is at the high temperature $T_H$, the magnetization of the W layer does not disappear, but is sufficiently weak. The magnetization of the M layer disappears, or is sufficiently weak. Even if sufficiently weak magnetization is left in both the M and W layers, the bias field Hb ↓ is sufficiently large, and the Hb ↓ forces the direction of magnetization of the W layer and that of the M layer in some cases to follow that of the Hb ↓. This state corresponds to CONDITION 2 in FIG. 11.

Thereafter, the W layer influences the M layer via $\sigma_W$ (i) immediately, or (ii) when cooling progresses after irradiation of the laser beam is stopped and the medium temperature is decreased below $T_H$, or (iii) when the irradiated portion is away from Hb, thereby aligning the direction of magnetization of the M layer in a stable direction. As a result, CONDITION 3 (P type) or 4 (A type) in FIG. 11 is established.

On the other hand, when the medium is at the low temperature $T_L$, both the W and M layers do not lose their magnetization. However, the magnetization of the M layer is relatively weak. In this case, there are two mark states, i.e., CONDITIONs 5 and 6 in FIG. 11 for P type, and there are also two mark states, i.e. , CONDITIONs 7 and 8 in FIG. 11 for A type. In CONDITIONs 6 and 8, a magnetic wall (indicated by a bold line) is generated between the M and W layers, and the medium is in a relatively unstable (metastable) condition. The medium portion in this condition is operated by Hb ↓ immediately before it reaches the irradiation position of the laser beam. Nevertheless, CONDITION 6 or 8 can be maintained. Because, since the W layer has sufficient magnetization at the room temperature, the direction of magnetization of the W layer will not be reversed by Hb ↓. The M layer in CONDITION 8, whose direction of magnetization is opposite to Hb ↓, receives the influence of the exchange coupling force $\theta_W$ larger than the influence of Hb ↓, and the direction of magnetization of the M layer is held in the same direction as that of the W layer since-the medium is of P type.

Thereafter, the portion in CONDITION 6 or 8 is irradiated with a low-level laser beam. For this reason, the medium temperature is increased. Upon an increase in medium temperature, the coercivities of the two layers are decreased. However, since the W layer has a high Curie temperature, a decrease in coercivity $H_{C2}$ is small, and the "A direction" ⇑ corresponding to the "initialized" direction of magnetization is maintained without being overcome with Hb ↓. On the other hand, since the medium temperature is lower than the Curie temperature $T_{C1}$ of the M layer although the M layer has the low Curie temperature, the coercivity $H_{C1}$ remains. However, since the coercivity $H_{C1}$ is small, the M layer receives (i) the influence of Hb ↓ and (ii) the influence via the exchange coupling force $\sigma_W$ from the W layer (force for aligning the direction of magnetization of the M layer in the same direction as that of the W layer in P type). In this case, the latter influence is stronger than the former influence, and the following formulas are simultaneously satisfied:

$$H_{c1} + Hb < \frac{\sigma_w}{2M_{s1}t_1} \text{ and} \qquad \text{Formula 10-2}$$

$$H_{c2} + Hb > \frac{\sigma_w}{2M_{s2}t_2} \qquad \text{Formura 10-3}$$

The lowest temperature at which these formulas are simultaneously satisfied will be called $T_{LS}$. In other words, the lowest temperature at which the magnetic wall in CONDITION 6 or 8 disappears is $T_{LS}$.

As a result, CONDITION 6 transits to CONDITION 9, and CONDITION 8 transits to CONDITION 10. On the other hand, CONDITION 5 originally having no magnetic wall is the same as CONDITION 9, and CONDITION 7 is the same as CONDITION 10. Consequently, a mark in CONDITION 9 (P type) or 10 (A type) is formed upon irradiation of the low-level beam regardless of the previous state (CONDITION or 6 for P type, or CONDITION 7 or 8 for A type).

This state is maintained when the medium temperature is decreased to the room temperature after the laser beam irradiation is stopped or the bit falls outside the irradiation position. CONDITION 9 (P type) or 10 (A type) in FIG. 11 is the same as CONDITION 6 (P type ) or 7 (A type) in FIG. 8.

As can be understood from the above description, the low-temperature cycle is executed without increasing the medium temperature up to the Curie temperature $T_{C1}$ of the M layer.

Even when the low-temperature cycle is executed at a temperature equal to or higher than $T_{C1}$, since the medium temperature is increased from the room temperature to $T_{C1}$ via $T_{Lmin}$. CONDITION 6 transits to CONDITION 9 for P type, and CONDITION 8 transits to CONDITION 10 for A type at that time. Thereafter, the medium temperature reaches $T_{C1}$, and CONDITION 5 shown in FIG. 8 is established.

In the above description, both the M and W layers have no compensation temperature $T_{comp}$ between the room temperature and the Curie temperature. However, when the compensation temperature $T_{comp}$ is present, if the medium temperature exceeds it, (i) the direction of magnetization is reversed, and (ii) A and P types are reversed. For these reasons, a description must be complicated accordingly. In this case, the direction of the bias field Hb is opposite to the direction in the above description at the room temperature.

In both the first and second categories, the recording medium is preferably constituted by the M and W layers-each of which comprises an amorphous ferrimagnetic material selected from transition metal (e.g., Fe, Co ) - heavy rare earth metal (e.g., Gd, Tb, Dy, and the like) alloy compositions.

When the materials of both the M and W layers are selected from the transition metal-heavy rare earth metal alloy compositions, the direction and magnitude of magnetization appearing outside the alloys are determined by the relationship between the direction and magnitude of sublattice magnetization of transition metal (TM) atoms, and those of heavy rare earth metal (RE) atoms inside the alloys. For example, the direction and magnitude of TM sublattice magnetization are represented by a vector indicated by a dotted arrow ↑, those of RE sublattice magnetization are represented by a vector indicated by a solid arrow ↑ and the direction and magnitude of magnetization of the entire alloy are represented by a vector indicated by a hollow arrow ⇓. In this case, the hollow arrow ⇑ (vector) is expressed as a sum of the dotted and solid arrows (vectors). However, in the alloy, the dotted and solid arrows (vectors) are directed in the opposite directions due to the mutual effect of the TM sublattice magnetization and the RE sublattice magnetization. Therefore, when magnitude of these magnetizations are equal to each other, the sum of the dotted and solid arrows (vectors), i.e., the vector of the alloy is zero (i.e., the magnitude of magnetization appearing outside the alloy becomes zero). The alloy composition making the vector of the alloy zero is called a compensation composition. When the alloy has another composition, it has magnitude equal to a difference between the magnitude of the two sublattice magnetization, and has a hollow arrow (vector ⇑ or ⇓ having a direction equal to that of the larger vector. Thus, a magnetization vector of the alloy is expressed by illustrating dotted and solid vectors adjacent to each other, as shown in, e.g., FIG. 12. The RE and TM sublattice magnetization states of the alloy can be roughly classified into four states, as shown (1A), (2A), (3A) and (4A) in FIG. 13. Magnetization vectors (hollow arrow ⇑ or ⇓ of the alloy in the respective states are shown (1B), (2B), (3B) and (4B) in FIG. 13. For example, the alloy in the sublattice magnetization states shown (1A) in FIG. 13 has magnetization vector shown (1B) in FIG. 13.

When one of the magnitude of the RE and TM vectors is larger than the other, the alloy composition is referred to as "oo rich" named after the larger vector (e.g., RE rich).

Both the M and W layers can be classified into TM rich and RE rich compositions. Therefore, when the composition of the M layer is plotted along the ordinate and that of the W layer is plotted along the abscissa, the types of medium as a whole of the basic invention can be classified into four quadrants, as shown in FIG. 14. In FIG. 14, the intersection of the abscissa and the ordinate represents the compensation composition of the two layers.

The P type medium described above belongs to Quadrants I and III in FIG. 14, and the A type medium belongs to Quadrants II and IV.

In view of a change in coercivity against a change in temperature, a given alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature ($T_{comp.}$). At a temperature lower than the compensation temperature, the RE vector (solid arrow) is larger than the TM vector (dotted arrow) (i.e., RE rich), and vice versa at a temperature higher than the compensation temperature. Therefore, the compensation temperature of the alloy having the compensation composition is assumed to be present at the room temperature.

In contrast to this, no compensation temperature is present between the room temperature and the Curie temperature in the TM rich alloy composition. The compensation temperature below the room temperature is nonsense in the magnetooptical recording, and hence, it is assumed in this specification that the compensation temperature is present between the room temperature and the Curie temperature.

If the M and W layers are classified in view of the presence/absence of the compensation temperature, the medium can be classified into four types. In Type 1, both the M and W layers have compensation temperatures. In Type 2, the M layer does not have a compensation temperature, and the W layer has a compensation temperature. In Type 3, the M layer has a compensation temperature, and the W layer does not have a compensation temperature. In Type 4, neither the M and W layers have compensation temperatures. A medium in Quadrant I includes all the four types of media. When both the M and W layers are classified in view of their RE or TM rich characteristics and in view of the presence/absence of the compensation temperature, recording media can be classified into the following nine classes.

TABLE 1

| | Quadrant I (P type) | | |
|---|---|---|---|
| Class | M layer: RE rich | W layer: RE rich | Type |

TABLE 1-continued

| | | | |
|---|---|---|---|
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |

| | Quadrant II (A type) | | |
|---|---|---|---|
| Class | M layer: RE rich | W layer: TM rich | Type |
| 5 | $T_{comp.}$ | No $T_{comp.}$ | 3 |
| 6 | No $T_{comp.}$ | No $T_{comp.}$ | 4 |

| | Quadrant III (P type) | | |
|---|---|---|---|
| Class | M layer: TM rich | W layer: TM rich | Type |
| 7 | No $T_{comp.}$ | No $T_{comp.}$ | 4 |

| | Quadrant IV (A type) | | |
|---|---|---|---|
| Class | M layer: TM rich | W layer: TM rich | Type |
| 8 | No $T_{comp.}$ | $T_{comp.}$ | 2 |
| 9 | No $T_{comp.}$ | No $T_{comp.}$ | 4 |

DESCRIPTION OF CLASS 1-1

The principle of the over-write operation will be described in detail below using a medium No. 1-1 belonging to a recording medium of Class 1 (P type, Quadrant I, and Type 1) shown in Table 1.

This medium No. 1-1 has the relations given by Formula 11:

$$T_R < T_{comp.1} < T_L < T_H \leq T_{C1} \leq T_{C2}$$

and, Formula 11-2:

$$T_{comp.2} < T_{C1}$$

In this specification, "=" in "≦" means "equal to" or "almost equal to" (about ±20° C.). For the sake of simplicity, a medium having a relation given by $T_H < T_{C1} < T_{C2}$ will be explained below. $T_{comp.2}$ may be higher than, equal to, or lower than $T_L$. However, for the sake of simplicity, $T_L < T_{comp.2}$. The above relations can be expressed by a graph shown in FIG. 15. Note that a thin curve represents the graph of an M layer, and a bold curve represents the graph of a W layer.

A condition that reverses only the direction of magnetization of the W layer by Hini. at room temperature $T_r$ without reversing that of the M layer is represented by Formula 12. This medium No. 1-1 satisfies Formula 12:

$$H_{c1} > H_{c2} + \frac{\sigma_w}{2M_{s1}t_1} + \frac{\sigma_w}{2M_{s2}t_2} \qquad \text{Formula 12}$$

where
$H_{C1}$: coercivity of M
$H_{C2}$: coercivity of W layer
$M_{S1}$: saturation magnetization of M layer
$M_{S2}$: saturation magnetization of W layer
$t_1$: film thickness of M layer
$t_2$: film thickness of W layer
$\sigma_w$: exchange coupling force=interface wall energy At this time, a condition for Hini. is represented by Formula 15. If Hini. disappears, the directions of magnetization of the M and W layers influence each other through an exchange coupling force. The conditions that can hold the directions of magnetization of the M and W layers without reversing them are represented by Formulas 13 and 14. The medium No. 1-1 satisfies Formulas 13 and 14:

$$H_{c1} > \frac{\sigma_w}{2M_{s1}t_1} \qquad \text{Formula 13}$$

$$H_{c2} > \frac{\sigma_w}{2M_{s2}t_2} \qquad \text{Formula 14}$$

The direction of magnetization of the W layer of the recording medium, which satisfies conditions given by Formulas 12 to 14 at room temperature, is oriented in, e.g., the "A direction" ⇧ by Hini. which satisfies Formula 15 before a time immediately before recording:

$$H_{c2} + \frac{\sigma_w}{2M_{s2}t_2} < |H_{ini}| < H_{c1} - \frac{\sigma_w}{2M_{s1}t_1} \qquad \text{Formula 15}$$

At this time, the M layer is left in the recorded state. This condition corresponds to either CONDITION 1 or 2 in FIG. 16. CONDITION 1 or 2 is held until a time immediately before recording. Note that the bias field Hb is assumed to operate in the "A direction" ↑.

Note that it is difficult to focus the bias field Hb to the same range as a region to be irradiated (spot region) of a laser beam as with normal magnetic fields. When a medium has a disk shape, recorded information (mark) is influenced by Hini. during one revolution of the medium, and is set in CONDITION 1 or 2 again. Thereafter, the mark passes a portion near the region to be irradiated (spot region) of the laser beam. At this time, the mark in CONDITION 1 or 2 is influenced by a bias field Hb since it approaches the bias field Hb. In this case, if the direction of magnetization of the M layer of the mark in CONDITION 2 having the direction of magnetization opposite to that of Hb is reversed by Hb, information recorded one revolution before is undesirably erased. A condition for preventing this is given by Formula 15-2:

$$H_{c1} > Hb + \frac{\sigma_w}{2M_{s1}t_1} \qquad \text{Formula 15-2}$$

The disk-shaped medium No. 1-1 must satisfy Formula 15-2 at room temperature. In other words, one condition for determining Hb is given by Formula 15-2.

The mark in CONDITION 1 or 2 then reaches the spot region of the laser beam. The laser beam intensity has two levels, i.e., high and low levels like in the basic invention.

Low-temperature Cycle

Upon irradiation with a low-level laser beam, the medium temperature is increased beyond $T_{comp.1}$. The medium type is then shifted from P type to A type. The relationship between the magnitude of RE and sublattice magnetization of the M layer is reversed from (3A) and (4A) in FIG. 13 although the directions of the sublattice magnetization are left unchanged. For this reason, the direction of magnetization of the M layer is reversed from (3B) and (4B) in FIG. 13. As a result the mark in CONDITION 1 in FIG. 16 transits to CONDITION 3, or the mark in CONDITION 2 transits to CONDITION 4.

The medium continues to be irradiated with the laser beam, and the medium temperature then reaches $T_{Lmin}$. In this state, Formulas 10-2 and 10-3 are satisfied simultaneously. As a result, even when Hb ↑ is present, the mark in CONDITION 4 in FIG. 16 transits to CONDITION 5. On the other hand, the mark in CONDITION 3 in FIG. 16 is maintained since Formula 15-3 is satisfied even when Hb ↑ is present. More specifically, CONDITION 3 merely transits to the same CONDITION 5 as CONDITION 3.

In this state, when the mark falls outside the spot region of the laser beam, the medium temperature begins to fall. When the medium temperature is decreased below $T_{comp.1}$, the medium type is restored from A type to original P type. The relationship between the magnitude of RE and TM sublattice magnetization of the M layer is reversed from (2A) and (1A) in FIG. 13. For this reason, the direction of magnetization of the M layer is reversed from (2B) and (1B) in FIG. 13. As a result, the mark in CONDITION 5 transits to CONDITION 6 (the direction of magnetization of the M layer is oriented in the "A direction" ↑). CONDITION 6 is maintained even when the medium temperature is decreased to room temperature. In this manner, the mark in the "A direction" ↑ is formed in the M layer.

High-temperature Cycle

Upon irradiation with a high-level laser beam, the medium temperature is increased up to the low temperature $T_L$ via $T_{comp.1}$. As a result, the same CONDITION 7 as CONDITION 5 in FIG. 16 is established.

Since the medium is irradiated with the high-level laser beam, the medium temperature is further increased. When the medium temperature exceeds $T_{comp.2}$. of the W layer, the medium type is shifted from A type to P type. The relationship between the magnitude of RE and TM sublattice magnetization of the W layer is reversed from (1A) and (2A) in FIG. 13 although the directions of the sublattice magnetization are left unchanged. For this reason, the direction of magnetization of the W layer is reversed from (1B) and (2B) in FIG. 13. As a result, the direction of magnetization of the W layer is oriented in the "non-A direct" ⇩. This condition is CONDITION 8 in FIG. 16.

However, since $H_{C2}$ is still large at this temperature, the direction of magnetization of the W layer will not be reversed by ↑ Hb. When the temperature is further increased and reaches $T_H$, the coercivities of the M and W layers are decreased since their temperatures are close to the Curie temperature. As a result, the medium satisfies two formulas in one of the following conditions (1) to (3):

$$|H_{c1} - H_{c2}| < \frac{\sigma_w}{2M_{s1}t_1} + \frac{\sigma_w}{2M_{s2}t_2} \qquad (1)$$

$$Hb > \frac{M_{s1}t_1 H_{c1} + M_{s2}t_2 H_{c2}}{M_{s1}t_1 + M_{s2}t_2}$$

$$Hb > H_{c1} + \frac{\sigma_w}{2M_{s1}t_1} \qquad (2)$$

$$Hb > H_{c2} - \frac{\sigma_w}{2M_{s2}t_2}$$

$$Hb > H_{c1} - \frac{\sigma_w}{2M_{s1}t_1} \qquad (3)$$

$$Hb > H_{c2} + \frac{\sigma_w}{2M_{s2}t_2}$$

For this reason, the directions of magnetization of the two layers are reversed at almost the same time, and follow the direction of Hb ↑. This condition corresponds to CONDITION 9 in FIG. 16.

When the mark falls outside the spot region of the laser beam, the medium temperature begins to fall. When the medium temperature is decreased below $T_{comp.2}$, the medium type is shifted from P type to A type. The relationship between the magnitude of TM and RE sublattice magnetization is reversed from (4A) and (3A) in FIG. 13 although the directions of the sublattice magnetization are left unchanged. For this reason, the direction of magnetization of the W layer is reversed from (4B) and (3B) in FIG. 13. As a result the direction of magnetization of the W layer is oriented in the "non-A direction" ⇓. This condition is CONDITION 10 in FIG. 16. In CONDITION 10, the medium satisfies Formula 15-4:

$$Hb < H_{c2} + \frac{\sigma_w}{2M_{s2}t_2} \qquad \text{Formula 15-4}$$

For this reason, the direction of magnetization of the W layer will not be reversed even when Hb ↑ operates on the W layer.

When the medium temperature is further decreased from the temperature in CONDITION 10 to a temperature below $T_{comp.1}$, the medium type is restored from A type to original P type. The relationship between the magnitude of RE and TM sublattice magnetization of the M layer is reversed from (4A) and (3A) in FIG. 13. For this reason the direction of magnetization of the M layer is reverse from (4B) and (3B) in FIG. 13. As a result, the direction of magnetization of the M layer is oriented in the "non-A direction" ⇓. This condition is CONDITION 11 in FIG. 16.

The medium temperature is then decreased from the temperature in CONDITION 11 to room temperature. Since $H_{C1}$ at room temperature is sufficiently large (see Formula 15-5), the direction of magnetization ⇓ of the M layer will not be reversed by ↑ Hb, and CONDITION 11 is maintained.

$$Hb < H_{c1} + \frac{\sigma_w}{2M_{s1}t_1} \qquad \text{Formula 15-5}$$

In this manner, the mark in the "non-A direction" ⇓ is formed in the M layer.

DESCRIPTION OF SELECTION INVENTION

In the above description, a two-layered film consisting of the M and W layers has been exemplified. An over-write operation is enabled even in a medium including a multi-layered film consisting of three or more layers as long as the medium has the above-mentioned two-layered film. In particular, in the above description, the initial field Hini. is used as the external means. However, in the basic invention, any other external means may be employed. That is, the direction of magnetization of the W layer need only be aligned in a predetermined direction before a time immediately before recording.

For this reason, a structure using, as an external means, an exchange coupling force from an initializing layer in place of Hini. was invented (Japanese Journal "OPTRONICS", 1990 No. 4, pp. 227-231; International Application Laid-Open WO 90/02200 for further details). This invention will be referred to as a selection invention hereinafter. The selection invention will be described below.

FIG. 17 shows a structure of a medium according to the selection invention. This medium comprises a substrate and a magnetic film formed on the substrate. The magnetic film has a four-layered structure constituted by sequentially stacking an M layer 1 consisting of a perpendicularly magnetizable magnetic thin film, a W layer 2 consisting of a perpendicularly magnetizable magnetic thin film, a switching layer (to be referred to as an S layer hereinafter; also referred to as a control layer in the above-mentioned journal "OPTRONICS") 3 consisting of a perpendicularly magnetizable magnetic thin film, and an initializing layer (to be referred to as an Ini layer hereinafter) 4 consisting of a perpendicularly magnetizable magnetic thin film (in some cases, the S layer 3 may be omitted).

Note that, in PCT WO 90/02400, the M layer is called a first magnetic layer, the W layer is called a second magnetic layer the S layer is called a third magnetic layer and the Ini. layer is called a fourth magnetic layer. In the PCT except for claim 3, the third and fourth magnetic layers are reversely called, and it seems to be an erroneous description. In the Journal "OPTRONICS", the S layer is called a control layer. In this four-layered structured medium, the M and W layers are exchange-coupled to each other, and the direction of magnetization of only the W layer can be aligned in a predetermined direction without changing the direction of magnetization of the M layer at a room temperature. In addition, the W and Ini. layers are exchange-coupled to each other via the S layer at a temperature equal to or lower than a Curie temperature of the S layer.

The Ini. layer has a highest Curie temperature, and does not lose its magnetization upon radiation of a high-level laser beam. The Ini. layer always holds magnetization in a predetermined direction, and serves as means for repetitively "initializing" the W layer to prepare for the next recording every time recording is performed. For this reason, the Ini. layer is called the initializing layer.

However, in a process of a high-temperature cycle (e.g., near $T_H$), the magnetization of the W layer must be reversed. In this case, the influence from the Ini. layer must become negligibly small. When the temperature is increased, an exchange coupling force $\sigma_{W24}$ between the W and Ini. layers can be conveniently decreased.

However, when sufficient $\sigma_{W24}$ remains even at $T_H$, the S layer is required between the W and Ini. layers. If the S layer consists of a non-magnetic member, $\sigma_{W24}$ can be reduced to zero or can become very small. However, $\sigma_{W24}$ must be large enough to "initialize" the W layer at a certain temperature between $T_H$ and the room temperature. In this case, the S layer must apply an apparently sufficient exchange coupling force between the W and Ini. layers. For this purpose, the S layer must consist of a magnetic member. Therefore, the S layer is converted to a magnetic member at a relatively low temperature to apply an apparently sufficient exchange coupling force $\sigma_{W24}$ between the W and Ini. layers, and is converted to a non-magnetic member at a relatively high temperature to apply a zero or very small exchange coupling force $\sigma_{W24}$ between the W and Ini. layers. For this reason, the S layer is called the switching layer.

The principle of a four-layered film over-write operation will be described below with reference to FIG. 17. A typical example will be described below, but there are some examples in addition to this example. A hollow arrow indicates a direction of magnetization of each layer.

A condition before recording corresponds to either CONDITION 1 or CONDITION 2. Paying attention to an M layer, in CONDITION 1, an "A-directed" mark ($B_1$) is formed, or in CONDITION 2, a "non-A-directed" mark ($B_0$) is formed, a magnetic wall (indicated by a bold line) is present between the M layer and a W layer, and the medium is in a relatively unstable (metastable) state.

Low-Temperature Cycle

A laser beam is irradiated on the mark in CONDITION 1 or 2 to increase a temperature. First, magnetization of an S layer disappears. For this reason, CONDITION 1 transits to CONDITION 3, or CONDITION 2 transits to CONDITION 4.

When the temperature is further increased, and reaches $T_{Lmin}$, the magnetization of the M layer is weakened, and the influence from the W layer via an exchange coupling force is strengthened. As a result, the direction of magnetization of the M layer in CONDITION 4 is reversed, and at the same time, the magnetic wall between the two layers disappears. This condition corresponds to CONDITION 5. The mark in CONDITION 3 originally has no magnetic wall between the two layers, and directly transits to CONDITION 5.

When irradiation of the laser beam is stopped or an irradiated portion is separated from the irradiation position, the temperature of the mark in CONDITION 5 begins to fall, and CONDITION 1 is then established via CONDITION 3.

This is the low-temperature cycle.

When the temperature is further increased from that in CONDITION 5, and exceeds the Curie temperature of the M layer, magnetization disappears, and CONDITION 6 is established. When irradiation of the laser beam is stopped or an irradiated portion is separated from the irradiation position, the temperature of the mark in CONDITION 6 begins to fall, and then reaches a temperature slightly lower than the Curie temperature of the M layer. Thus, magnetization appears in the M layer. In this case, the direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 5 is reproduced. The temperature is further decreased, and CONDITION 3 is established accordingly. Thereafter, a mark in CONDITION 1 is formed. This process is another example of the low-temperature cycle.

High-Temperature Cycle

When a laser beam is irradiated on the mark in CONDITION 1 or 2 to increase a temperature, CONDITION 6 is established via CONDITION 5, as described above.

When the temperature is further increased, the coercivity of the W layer is decreased considerably. For this reason, the direction of magnetization of the W layer is reversed by a bias field Hb ↓. This is CONDITION 8.

When irradiation of the laser beam is stopped or an irradiated portion is separated from the irradiation position, the medium temperature begins to fall. The medium temperature then reaches a temperature slightly lower than the Curie temperature of the M layer. Thus, magnetization appears in the M layer. The direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 9 appears.

When the temperature is further decreased, magnetization appears in the S layer. As a result, the W layer and an Ini. layer are magnetically coupled (by the exchange coupling force). As a result, the direction of magnetization of the W layer is aligned in a stable direction with respect to the direction of magnetization of the Ini. layer (i.e., in a direction not to form a magnetic wall between the layers). Since the medium is of P type, the direction of magnetization of the W layer is reversed to the "A direction", and as a result, an interface wall is formed between the M and W layers. This condition is maintained at the room temperature, and a mark in CONDITION 2 is formed.

This is the high-temperature cycle.

When the temperature is further increased after CONDITION 8 appears by the bias field Hb ↓, the temperature then exceeds the Curie temperature of the W layer. As a result, CONDITION 7 appears.

When irradiation of the laser beam is stopped or an irradiated portion is separated from the irradiation position, the medium temperature begins to fall. The medium temperature then reaches a temperature slightly lower than the Curie temperature of the W layer. Thus, magnetization appears in the W layer. The direction of magnetization of the W layer follows the direction of the bias field Hb ↓. As a result, CONDITION 8 appears.

When the temperature is further decreased, a mark in CONDITION 2 is formed via CONDITION 9. This process is another example of the high-temperature cycle.

Over-write Operation

As described above, a mark ($B_1$) in CONDITION 1 is formed in the low-temperature cycle, and a mark ($B_0$) in CONDITION 2 is formed in the high-temperature cycle independently of a previous recording state. Therefore, an over-write operation is enabled.

R LAYER

The M layer must satisfy various conditions. For this reason, it is difficult to determine the composition of the M layer from the view point of the large magnetic Kerr effect and the high C/N ratio. Thus, a proposal for forming a readout layer (to be abbreviated to as an R layer hereinafter) on the M layer has been made. For example, please refer to Japanese Laid-open Patent Application No. 63-237238 (corresponding to Examples 34 and 35 of EP 258,978 A2) assigned to CANON INC. Example 1 (corresponding to Example 34 of EP 258,978 A2) describes an over-write capable medium which comprises a GdFeCoTi R layer, a TbFe M layer, a GdTbFe Int. layer, and a TbFeCo W layer.

PROBLEMS TO BE SOLVED BY THE INVENTION

According to the prior art, however, a recording medium in which noise in reproduction is increased and a C/N ratio is not increased to an expected C/N ratio is often obtained. It is an object of the present invention to solve the above problems.

SUMMARY OF THE INVENTION

According to the present invention, there is provided a magnetooptical recording/reproduction medium (claim 1) which can perform an overwrite operation in accordance with an optical modulation scheme, comprising a reading layer (R layer), a memory layer (M layer), and a writing layer (W layer), the R layer, the M layer, and the W layer being exchange-coupled to each other to form a three-layered structure, wherein the medium satisfies the following conditions at room temperature during reproduction (a temperature obtained when a heating operation is performed by radiating a laser beam during reproduction)

(a) $2M_{SR}H_{CR}t_R < \sigma_{W1}$ (b) $2M_{SR}H_{CR}t_R + 2M_{S1}H_{C1}t_1 > \sigma_{W12}$ (c) $Hb < (\sigma_{W R1}/2M_{SR}t_R) + H_{CR}$ where $t_R$ is the film thickness of the R layer, $t_1$ is the film thickness of the M layer, $M_{SR}$ is the saturation magnetization of the R layer, $M_{S1}$ is the saturation magnetization of the M layer, $H_{CR}$ is the coercivity of the R layer, $H_{C1}$ is the coercivity of the M layer, $\sigma_{WR1}$ is an exchange coupling force between the R layer and the M layer, $\sigma_{W12}$ is an exchange coupling force between the M layer and the W layer, and Hb is a recording magnetic field.

When factors for a low C/N ratio were investigated, the following (i) to (viii) were extracted. Note that, in general, a reproduction apparatus also operates as a recording apparatus. (i) The magnetization of the M layer is reversed by Hini. (ii) The magnetization of the M layer is reversed by a heating operation performed by a laser beam during reproduction. (iii) The magnetization of the M layer is automatically reversed by itself. (iv) The M layer is not exchange-coupled with the W layer. (v) An exchange coupling energy between the M layer and the W layer is larger than the sum of the Zeeman energies of the R layer and the W or M layer. (vi) The W layer is not "initialized" before recording. (vii) The magnetization of the W layer in Hini. is different from that in a zero magnetic field. (viii) The magnetization of the R layer is reversed by a recording magnetic field Hb during reproduction.

The recording medium according to the present invention does not have the above factors, thereby achieving the above object. When $M_{SR}$, $M_{S1}$, $H_{CR}$, $H_{C1}$, $\sigma_{WR1}$, $\sigma_{W12}$, and the like are measured by a preliminary experiment, the compositions of the R, M, and W layers are designed according to the present invention.

BRIEF DESCRIPTION OF THE DRAWINGS

FIG. 4 is a waveform chart of a laser beam when an overwrite operation is performed according to the basic invention;

FIG. 5 is a waveform chart of a laser beam when an overwrite operation is performed using two beams according to the basic invention;

FIG. 6 is a graph showing the relationship between a coercivity and a temperature of first and second layers of an overwrite-capable magnetooptical recording medium;

FIG. 7 is a schematic view showing directions of magnetization of the first and second layers;

DETAILED DESCRIPTION OF THE PREFERRED EMBODIMENTS

Figure 1:
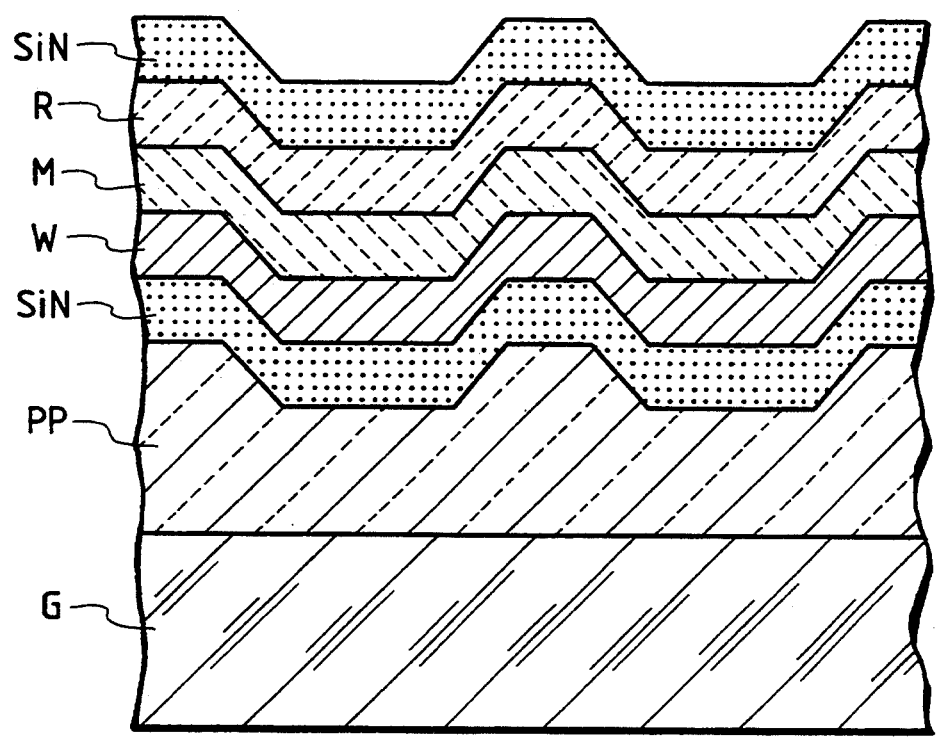
FIG. 1 is a schematic view showing the sectional structure of an overwrite-capable magnetooptical recording disk according to an example of the present invention.
Figure 2:
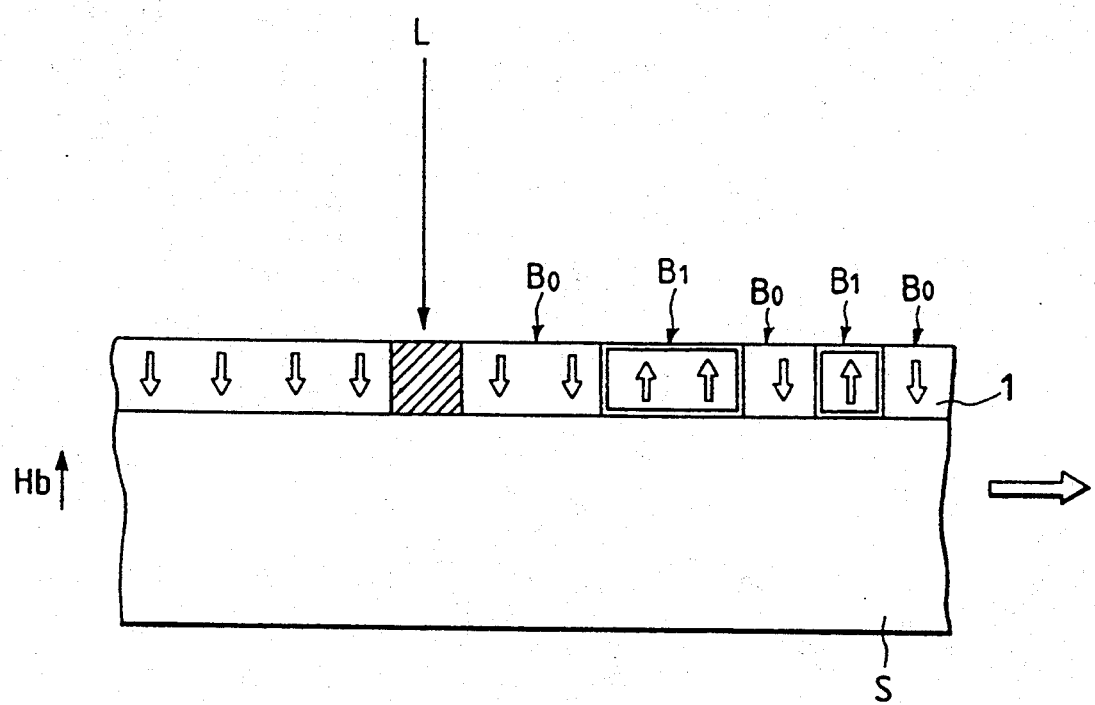
FIG. 2 is schematic view for explaining the principle of recording of a magnetooptical recording method.
Figure 3:
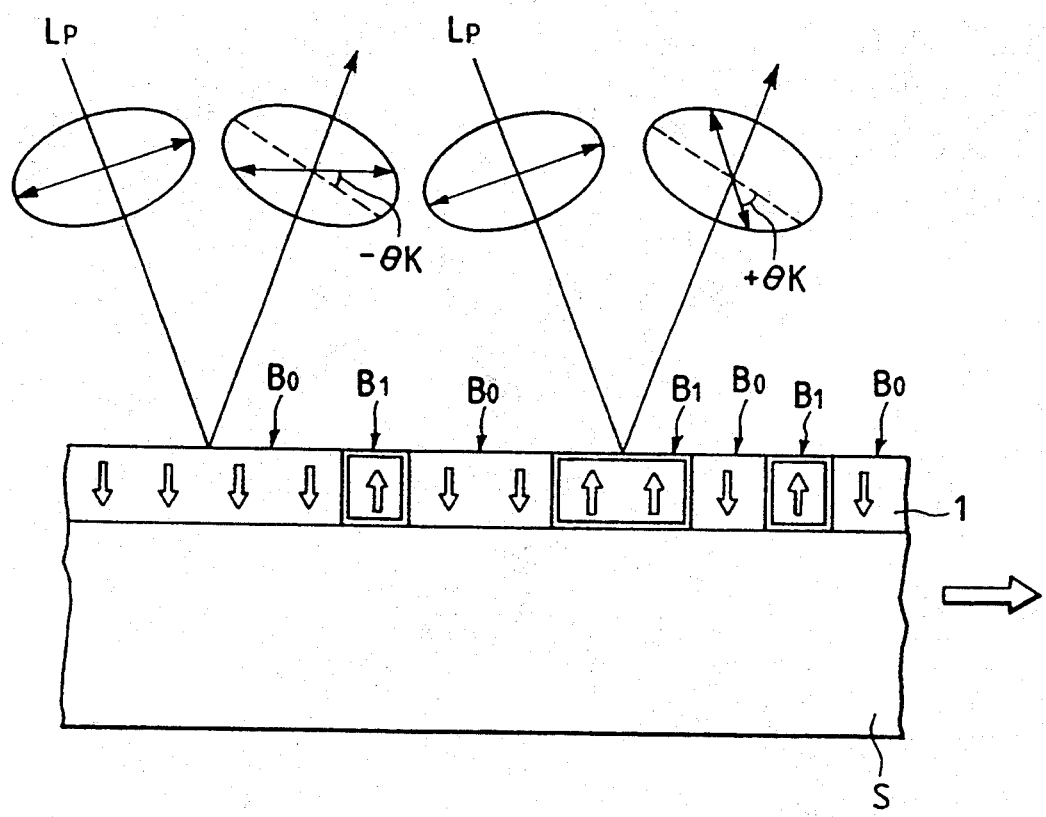
FIG. 3 is a schematic view for explaining the principle of reproduction of the magnetooptical recording method.
Figure 8:
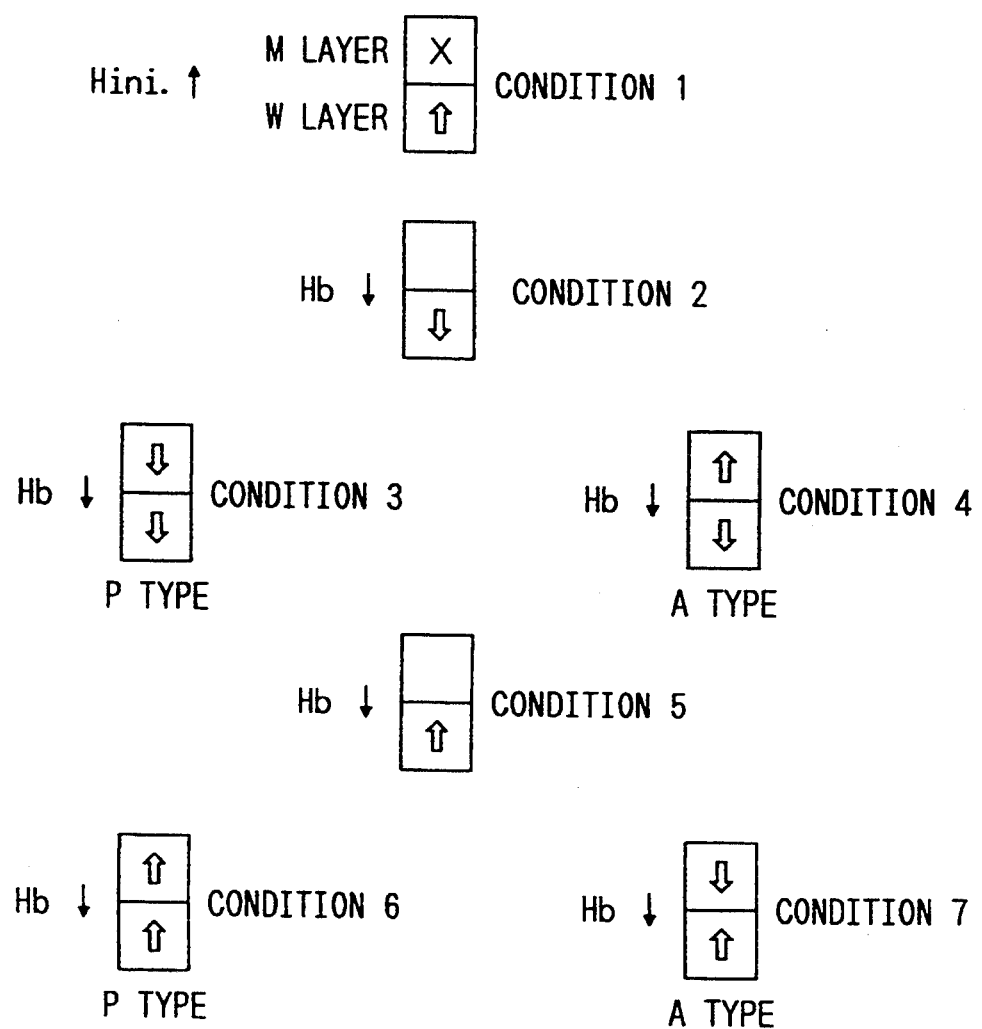
FIG. 8 is a diagram showing changes in direction of magnetization of the first and second layers.
Figure 9:
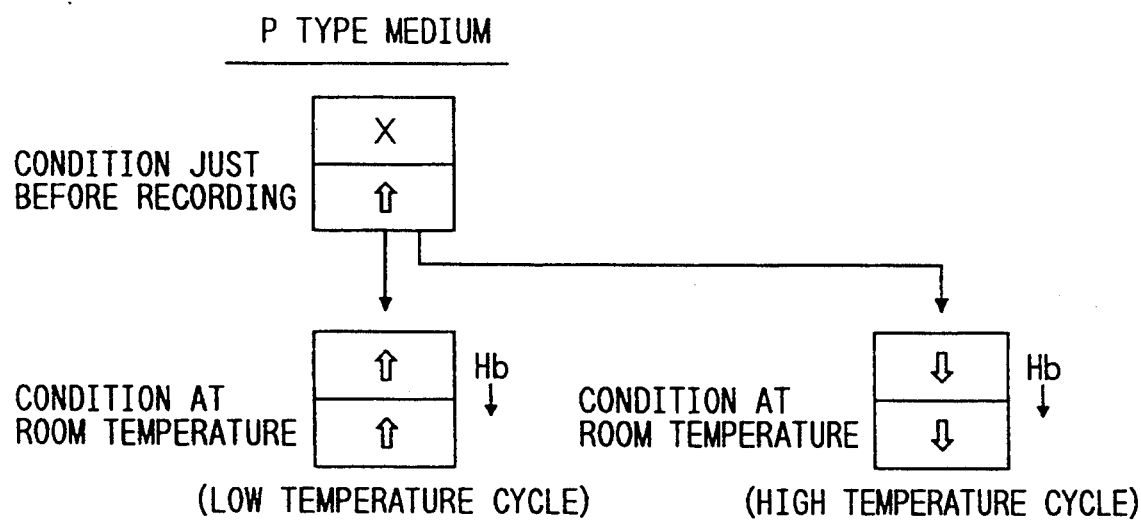
FIG. 9 is a diagram showing changes in direction of magnetization of the first and second layers of P type medium after the low-and high-temperature cycles, and show conditions at a room temperature.
Figure 10:
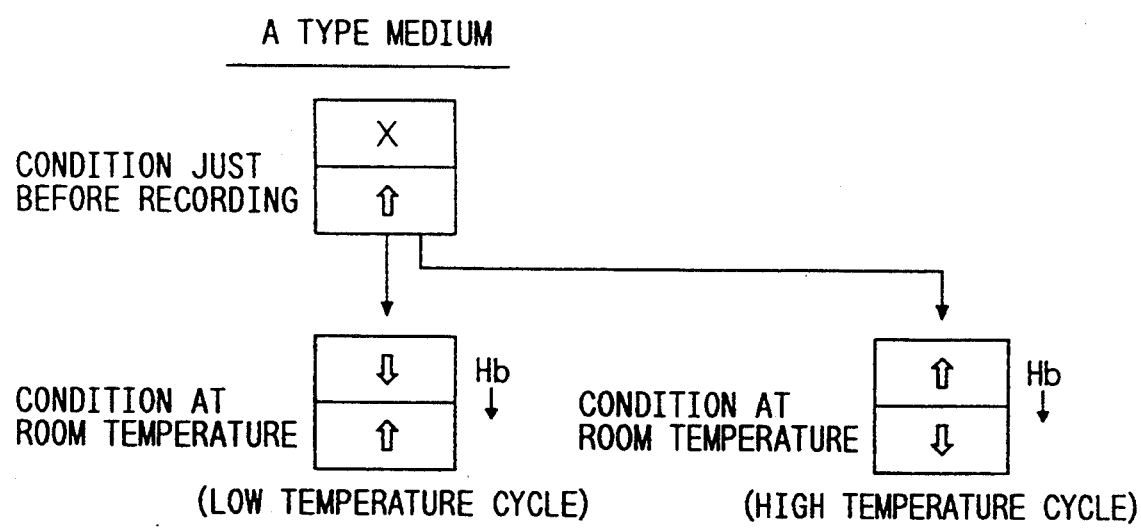
FIG. 10 is a diagram showing changes in direction of magnetization of the first and second layers of A type medium after the low-and high-temperature cycles, and show conditions at a room temperature.
Figure 11:
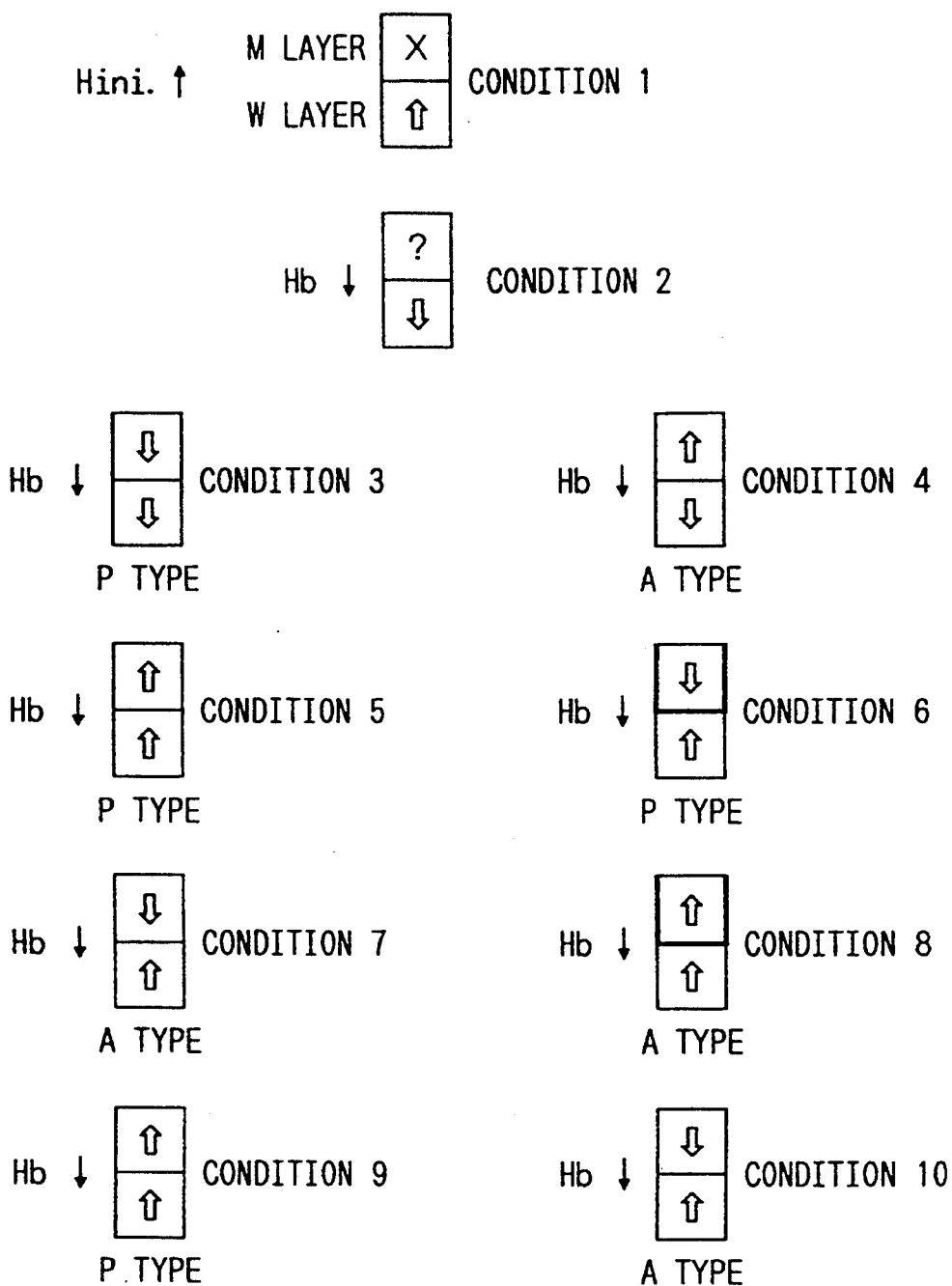
FIG. 11 is a diagram showing changes in direction of magnetization of the first and second layers.
Figure 12:
FIG. 12 is an explanatory view for comparing a vector (solid arrow) representing a sublattice magnetization of a rare-earth (RE) atom, and a vector (dotted arrow) representing a sublattice magnetization of a transition-metal (TM) atom.
Figure 13:
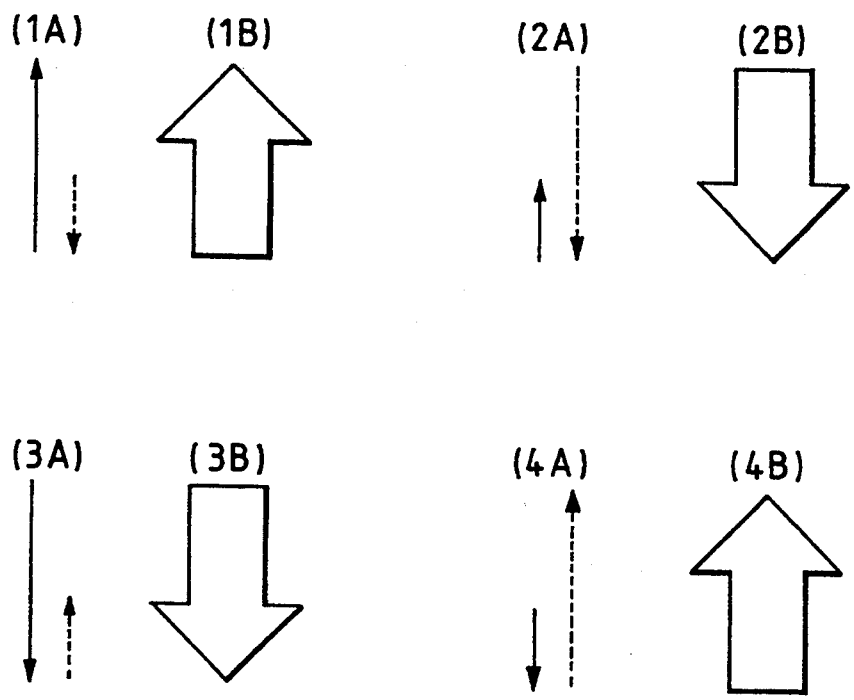
FIG. 13 is explanatory view showing the relationship between the sublattice magnetization vectors ↑ and ↓ and a hollow arrow indicating the direction of magnetization of an alloy.
Figure 14:
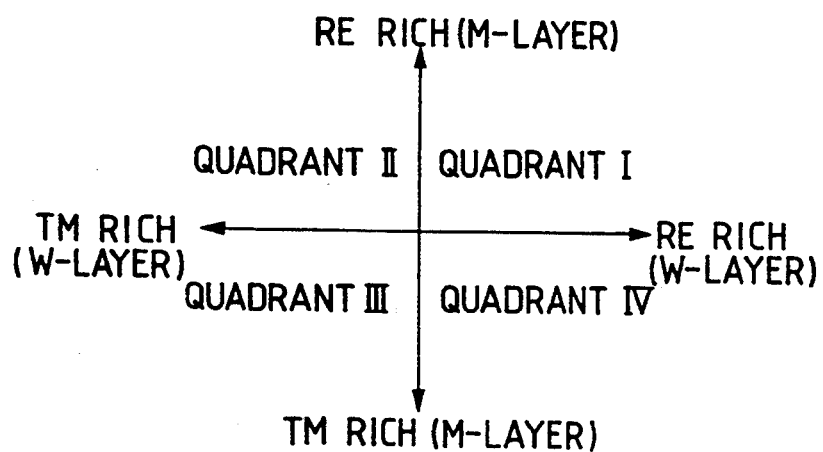
FIG. 14 is a map showing types of media classified into four quadrants.
Figure 15:
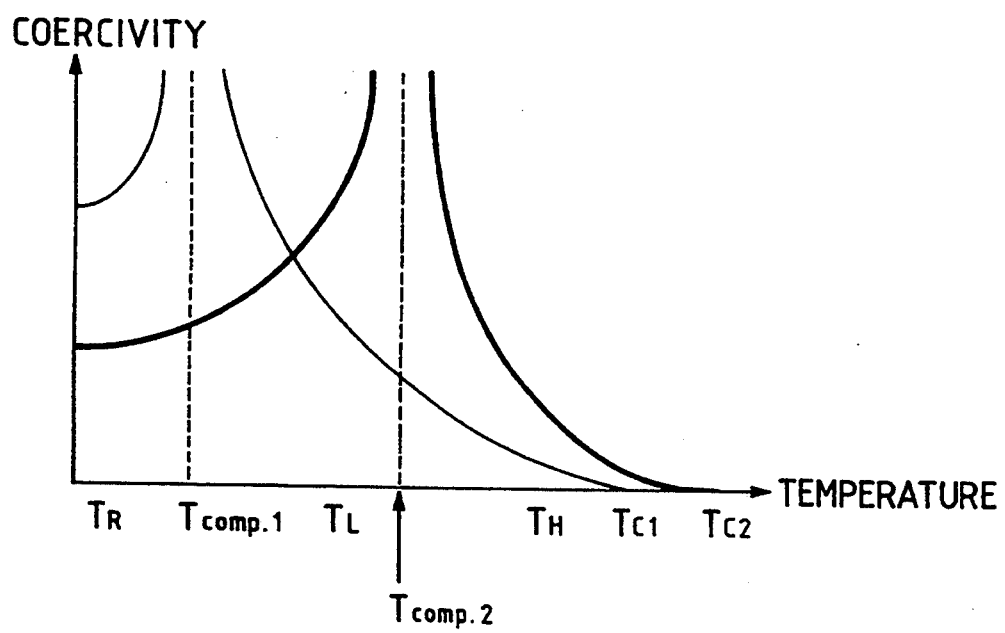
FIG. 15 is a graph showing the relationship between the coercivities and the temperatures of M and W layers of an over-write capable magnetooptical recording medium No. 1-1.
Figure 16:
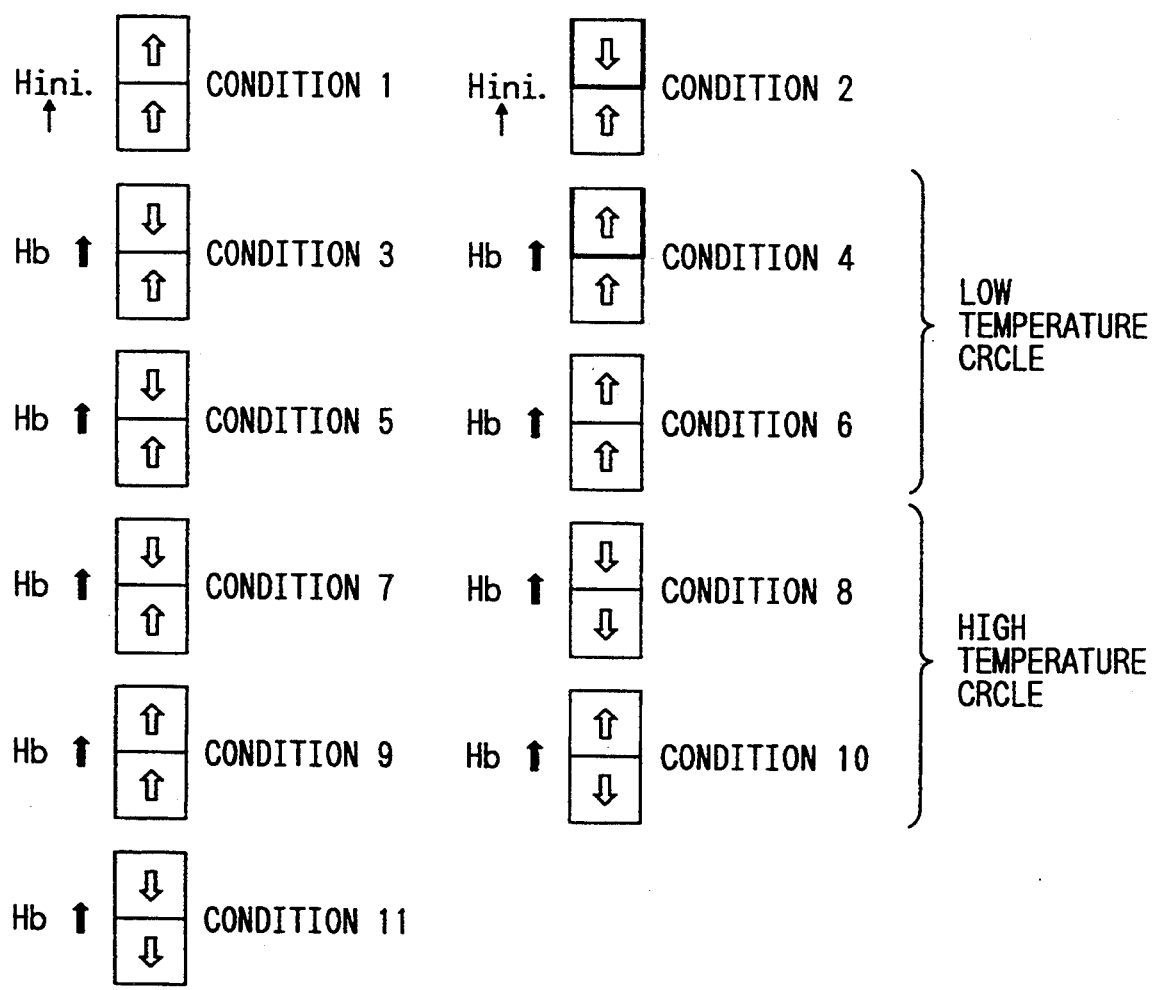
FIG. 16 is a chart showing changes in directions of magnetization of the M and W layers as a result of low-and high-temperature cycles of the medium No. 1-1.
Figure 17:
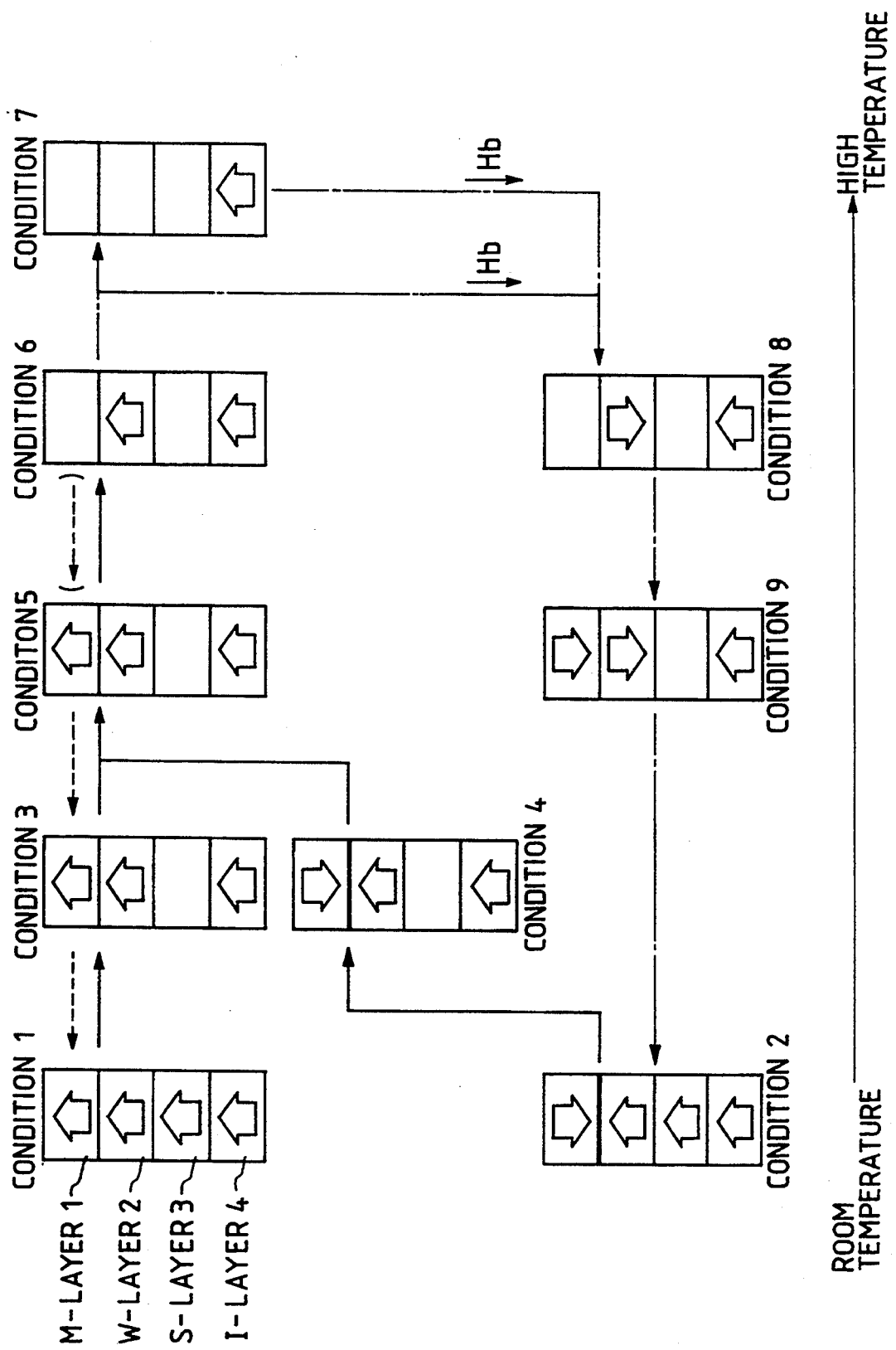
FIG. 17 is a chart for explaining the over-write principle of a four-layered structure over-write capable magnetooptical recording medium according to the selection invention.

The present invention will be described in detail below by way of its example. However, the present invention is not limited to this.

EXAMPLE 1

(1) A 2P substrate obtained by forming an ultraviolet-curing resin layer (PP) having a thickness of about 50 μm on a glass substrate (G) having a diameter of 130 mm and a thickness of 1.2 mm was prepared. A large number of grooves were formed in the resin layer (PP) in a spiral form from an inner peripheral side (radius r=30 mm position) to an outer peripheral side (r=60 mm position ).

(2) An ordinary RF sputtering apparatus was prepared, and the 2P substrate was set in the chamber of the apparatus. The substrate was rotated. A silicon nitride layer (first protective layer) having a thickness of 700 Å was formed first, and an R layer constituted by a GdFeCo perpendicular magnetization film, an M layer constituted by a TbFeCo perpendicular magnetization film, and a W layer constituted by a DyFeCo perpendicular magnetization film were formed. Finally, a silicon nitride layer (second protective layer) was formed.

In this manner, an overwrite-capable magnetooptical recording medium was obtained. The magnetic characteristics of the medium are shown in Table 2.

TABLE 2

|  | R Layer | M layer | W layer |
| --- | --- | --- | --- |
| Target (M layer is of a two-element system) | GdFeCo alloy | Tb FeCo alloy | DyFeCo alloy |
| Film thickness (Å) | 300 | 200 | 500 |
| Ms (emu/cc) | 75 | 100 | 170 |
| Hc (Oe) | 300 | 25600 | 800 |
| Tc (°C.) | 380 | 150 | 300 |
| Tcomp. | 160 | 110 | 170 |
| $\sigma_{W R1}$ (room temperature) | 1.2 erg/cm² | | — |
| $\sigma_{W12}$ (room temperature) | — | | 0.8 erg/cm² |

In this case, when calculation is performed, the medium satisfies: condition (a) because $2_{SR}H_{CR}t_R=0.3$ and $\sigma_{W12}=1.2$; condition (b) because $2M_{SR}H_{CR}t_R+2M_{S1}H_{C1}t_1=10.54$ and $\sigma_{W12}=0.8$; condition (c) because $Hb=500$ Oe and $(\sigma_{WR1}/2M_{SR}t_R)+H_{CR}=566.7$ Oe.

When the C/N ratio of the medium was measured using a magnetooptical recording/reproduction apparatus (Hb=500 Oe), a high C/N ratio of 55.4 dB could be obtained.

Comparative Example

A medium having magnetic characteristics represented in table 3 was manufactured by the same method as that of Example 1 except that the thickness of an R layer was changed.

TABLE 3

|  | R Layer | M layer | W layer |
| --- | --- | --- | --- |
| Target (M layer is of a two-element system) | GdFeCo alloy | Tb FeCo alloy | DyFeCo alloy |
| Film thickness (Å) | 700 | 200 | 500 |
| Ms (emu/cc) | 75 | 100 | 170 |
| Hc (Oe) | 300 | 25600 | 800 |
| Tc (°C.) | 380 | 150 | 300 |
| Tcomp. | 160 | 110 | 170 |
| $\sigma_{WR1}$ (room temperature) | 1.2 erg/cm² | | — |
| $\sigma_{W12}$ (room temperature) | — | | 0.8 erg/cm² |

In this case, when calculation is performed, the medium satisfies: condition (a) because $2M_{SR}H_{CR}t_R=0.3$ and $\sigma_{W12}=1.2$; condition (b) because $2M_{SR}H_{CR}t_R+2M_{S1}H_{C1}t_1=10.54$ and $\sigma_{W12}=0.8$. However, the medium does not satisfy condition (c) because $Hb=500$ Oe and $(\sigma_{WR1}/2M_{SR}t_R)+H_{CR}=414.29$ Oe.

When the C/N ratio of the medium was measured using a magnetooptical recording/reproduction apparatus (Hb=500 Oe), the C/N ratio was as low as 42.3 dB.

According to the present invention, even when reproduction is performed by the magnetooptical recording/reproduction apparatus which can also operate as a recording apparatus, a high C/N ratio can always be obtained.

What is claimed is:

1. A magnetooptical recording/reproduction medium which can perform an overwrite operation in an optical modulation scheme, comprising:
   a reading layer (R layer);
   a memory layer (M layer); and
   a writing layer (W layer), said R layer, said M layer, and said W layer being exchange-coupled to each other to form a three- layered structure,
   wherein said medium satisfies the following conditions at room temperature and during reproduction
   i) $2M_{SR}H_{CR}t_R < \sigma_{WR1}$
   ii) $2M_{SR}H_{CR}t_R + 2M_{S1}H_{C1}t_1 > \sigma_{W12}$
   iii) $Hb < (\sigma_{WR1}/2M_{SR}t_R) + H_{CR}$
   where $t_R$ is a film thickness of said R layer, $t_1$ is a film thickness of said M layer, $M_{SR}$ is saturation magnetization of said R layer, $M_{S1}$ is saturation magnetization of said M layer, $H_{CR}$ is a coercivity of said R layer, $H_{C1}$ is a coercivity of said M layer, $\sigma_{WR1}$ is an exchange coupling force between said R layer and said M layer, $\sigma_{W12}$ is an exchange coupling force between said M layer and said W layer, and Hb is a recording magnetic field.

* * * * *